United States Patent [19]

Mizuno et al.

[11] Patent Number: 5,181,947
[45] Date of Patent: Jan. 26, 1993

[54] METHOD FOR MANUFACTURING A GLASS FIBER

[75] Inventors: Yasuo Mizuno; Masaki Ikeda; Akihiko Yoshida, all of Hirakata, Japan

[73] Assignee: Matsushita Electric Industrial Co., Ltd., Osaka, Japan

[21] Appl. No.: 772,193

[22] Filed: Oct. 7, 1991

[30] Foreign Application Priority Data

Oct. 9, 1990 [JP] Japan .................. 2-271133

[51] Int. Cl.⁵ .......................................... C03B 37/022
[52] U.S. Cl. ................................. 65/2; 65/13; 65/77; 65/187
[58] Field of Search .............. 65/2, 13, 66, 77, 86, 65/183, 187

[56] References Cited

U.S. PATENT DOCUMENTS

| | | | |
|---|---|---|---|
| 1,992,994 | 3/1935 | Delpech | 65/187 X |
| 2,426,990 | 9/1947 | Ellefson | 65/66 X |
| 2,910,805 | 11/1959 | Muller et al. | 65/187 X |
| 2,980,957 | 4/1961 | Hicks | 65/2 |
| 3,063,094 | 11/1962 | Warthen | |
| 3,078,695 | 2/1963 | Kozak et al. | 65/187 X |
| 3,726,656 | 4/1973 | Reid et al. | 65/3.11 |
| 4,145,200 | 3/1979 | Yamazaki et al. | 65/2 |
| 4,885,020 | 12/1989 | Nishino et al. | 65/2 |

FOREIGN PATENT DOCUMENTS 0109131 5/1984 European Pat. Off. .
0266031 5/1988 European Pat. Off. .
2378724 1/1978 France .

Primary Examiner—Robert L. Lindsay
Attorney, Agent, or Firm—Panitch, Schwarze, Jacobs & Nadel

[57] ABSTRACT

A method for manufacturing a glass fiber having a polygonal cross section is provided. According to the method, a glass fiber having an orbicular cross section is manufactured by drawing molten glass supplied into a crucible heated at higher temperatures than a softening point of glass out of a nozzle having an orbicular cross section heated at lower temperatures than the heating temperature of the crucible and at higher temperatures than the softening point of glass. Then, the glass fiber is passed through a slit of a twin roller, having a predetermined shape, whereby glass fibers having a polygonal cross section are successively manufactured. The twin roller is heated at slightly higher temperatures than the softening point of the glass.

9 Claims, 6 Drawing Sheets

Fig. 1
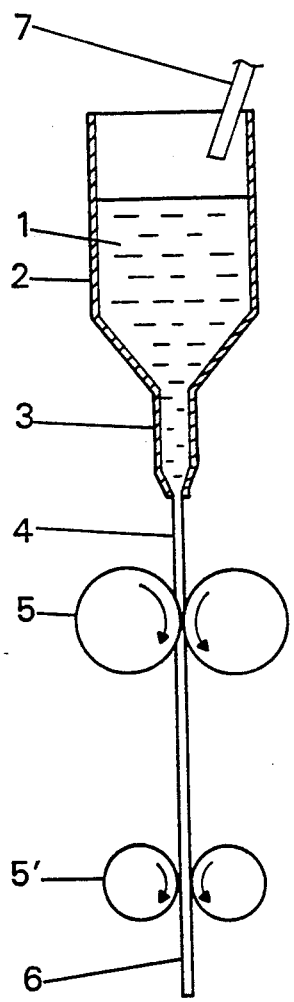
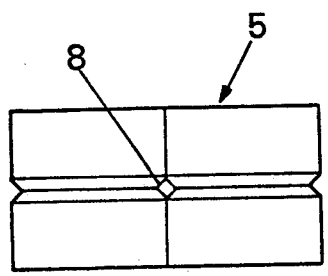
Fig. 2a
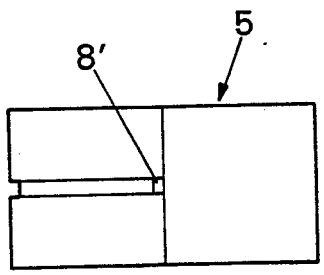
Fig. 2b
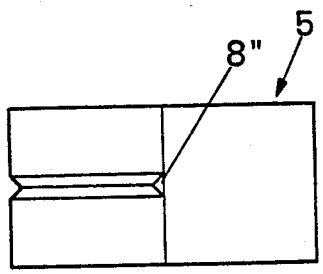
Fig. 2c

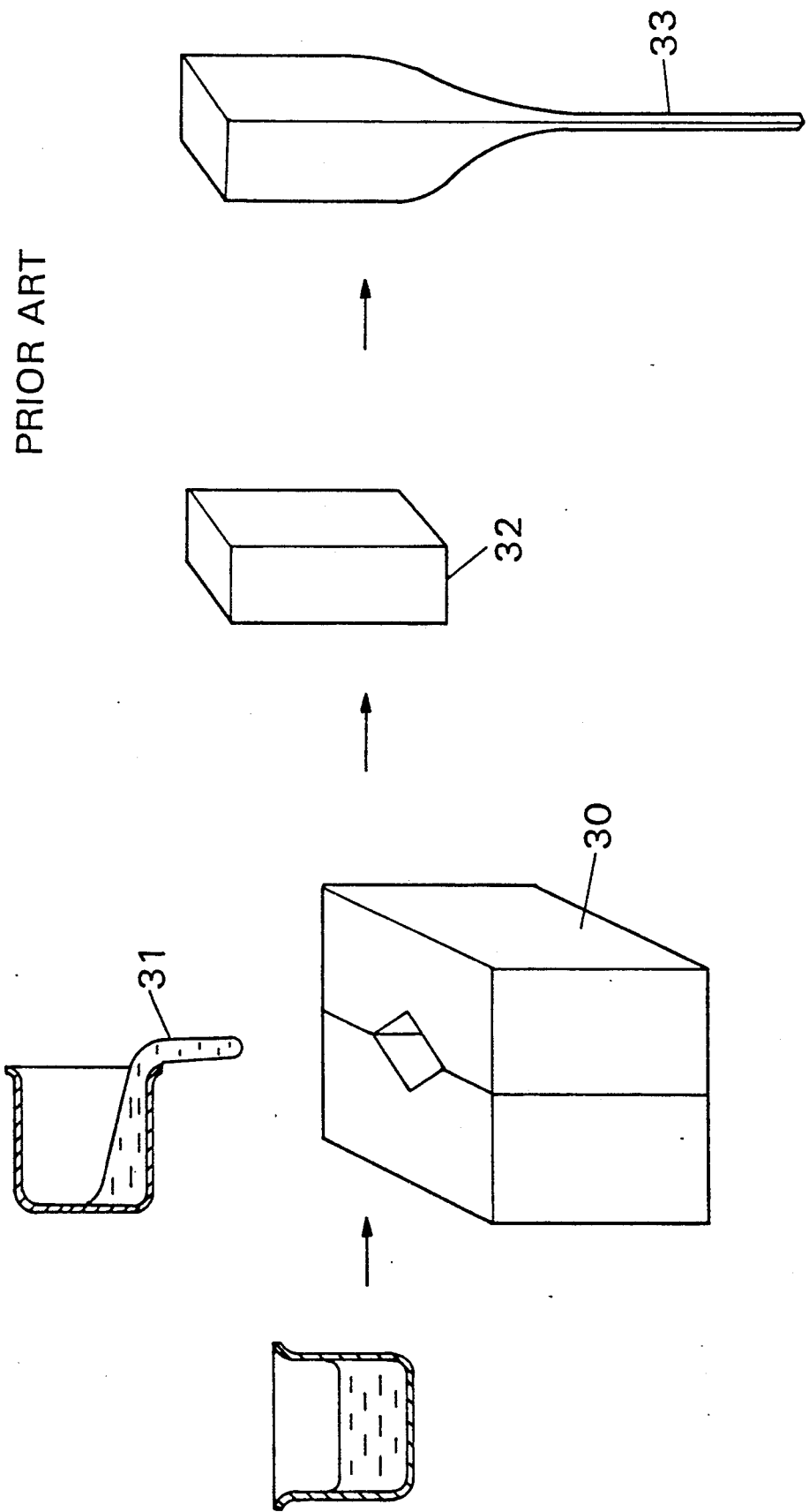

METHOD FOR MANUFACTURING A GLASS FIBER

BACKGROUND OF THE INVENTION

1. Field of the Invention

The present invention relates to a method for manufacturing a glass fiber having a polygonal cross section.

2. Description of the Prior Art

Recently, the demand for glass parts has increased in accordance with the development of electronics, and various types of glass have been developed from the point of view of shape as well as composition and property. Typical shapes of such glass are of plate, powder, tube, capillary, disk, fiber, and the like. The present invention relates to a method for manufacturing a glass fiber.

A prior art method will be described hereinbelow, using a sealing glass for the application to a gap of a magnetic head as one example. FIG. 3 shows a representative manufacturing process of a magnetic head for a video tape recorder.

In FIG. 3, material of a tip 45 for the magnetic head is cut from a ferrite ingot 44 in step (a), and the surface of the material is ground so as to make a bar suitable in size in step (b). Next, grooves 46 for placing reinforcing glass are made by a track processing in step (c), and glass 47 is molded into the grooves in step (d). Then, the excessive glass is ground, and the surface of a gap 49 is polished with a groove for a coil being made in step (e). Thereafter, glass for the gaps is sputtered, and the two bars are adhered to each other, so gaps 50 are formed in step (f). Then, the adhered bar is cut to make tips in step (g), and the sides of the tip are polished to make a tip 52 having a suitable size in step (h). Next, the tip 52 is adhered to a base 53 in step (i), a tape traveling surface 54 is polished in step (j), and a magnetic head 55 is completed with wire (not shown) being wound in step (k).

As shown in FIG. 4, a ferrite 12 is adhered to the completed magnetic head with glass for adhesion 13.

In the above-mentioned glass mold process of FIG. 3 step (c), generally, a fiber glass is used as the mold glass. Moreover, recently, a fiber glass having a quadrangular cross section is used more than a fiber having an orbicular cross section. This is because, as shown in FIG. 5, in the case of the orbicular fiber, a back grooved section 58 must be provided at the opposite side of the grooves by the track processing of a ferrite bar 57, and a jig 59 for giving inclination must be used in order to prevent the orbicular fiber 56 from falling down. Therefore, in the case of the quadrangular fiber, it is unnecessary to consider the above-mentioned two matters as shown in FIG. 6, and a simple base 9 can be used. Although the fiber shown in FIG. 6 has a quadrangular cross section, a fiber having a triangular cross section may also be used.

There are two conventional and representative methods by which a glass fiber having a quadrangular or a triangular cross section is formed. One of them is a method, as shown in FIG. 7, in which a block of glass 38 is cut by a diamond cutter and the like, so as to make a plate 39 and the plate 39 is cut to form a fiber 40 having the desirable size. However, in this conventional method for producing a glass fiber, there are problems which will be described hereinbelow. When cutting the glass block, it is necessary to pour water onto the cutting portions so that the cutting portions are cooled and the cut powders are cleared away. At this time, the water reacts with the glass because a large amount of heat is generated during the cutting and the temperature rises. As a result, the glass in the vicinity of the cutting portions is liable to change in quality. Moreover, it is difficult to make a flat surface of the cutting portions due to chatter vibrations of the glass cutting. Therefore, the resulting surface has an unevenness, so that the surface of the glass is rough and the glass is cloudy. When the above-mentioned step (d) is carried out for the production of the magnetic head using this fiber, the air existing in the concave portions of the unevenness of the surface is enclosed into the glass, so that the air remains in the glass as bubbles. The glass having bubbles causes recording and reproducing efficiency to attenuate at the head, leads to the flaw in the tape, and causes the tip to crack.

The other method, as shown in FIG. 8, is that first, a glass block 41 is cut so as to obtain a small block 42 whose thickness is about ten times larger than the desired thickness by using a diamond cutter and the like. The small block 42 is then heated and drawn to make a glass fiber 43 having a polygonal cross section. However, even in this method, it is indispensable to cut the glass block in order to make a small block. Therefore, the glass in the vicinity of the cutting portions inevitably changes in quality.

The surfaces of the glass fibers obtained by the conventional methods shown in FIGS. 7 and 8 are analyzed by using an ESCA, which is a kind of an electron spectroscopy, which reveals that on the surfaces, modified layers caused by the processing has a composition that is different from that of the internal portions. For example, when a ratio of lead having a peak strength of $4f_{7/2}$ to silicon having a peak strength of 2P (lead/silicon) is examined by the ESCA, the ratio on the surfaces of the glass fibers is 2, and that in the internal portions is 10. In this way, when water is used while the glass is being cut, lead is eluted onto the surface of the glass and the amount of lead on the surface becomes 1/5 of that of the internal portion, thereby forming a modified layer caused by processing on the surface of the glass.

A method for producing a glass fiber having a polygonal cross section without cutting a glass block has been proposed. For example, as shown in FIG. 9, molten glass 31 is poured into a metal mold 30 having a polygonal cross section so as to form a base bar 32, and the base bar 32 is heated and drawn into a heating furnace, whereby a glass fiber 33 having a polygonal cross section can be produced. In order to mass-produce glass fibers by using this method, first, a plurality of base bars 32 are provided, one base bar is drawn, this base bar is removed from a heating furnace and another base bar must be placed in the heating furnace. Therefore, there arises a problem in that production efficiency is unsatisfactory.

Furthermore, U.S. Pat. No. 4,885,020 discloses a method for producing a glass fiber having a polygonal cross section. According to this method, as shown in FIG. 10a, the molten glass 31 accommodated in a crucible is pulled up, thereby molding the glass into a fiber 34 having an orbicular cross section. After that, the fiber having an orbicular cross section is passed through a polygonal slit 35 provided at a twin roller as shown in FIG. 10b, whereby a fiber 37 having a polygonal cross section is produced. In this method, when the glass in the crucible is decreased in amount, the molding of the glass fiber is stopped, molten glass is supplied into the crucible, and the crucible must be heated so that the supplied glass and the glass which has been stored in the crucible become uniform. After that, the crucible must be sufficiently cooled until the molten glass has sufficient viscosity to be pulled up. In this way, even in this method, there are problems in that the production efficiency is unsatisfactory, and fibers having a polygonal cross section cannot be successively produced.

SUMMARY OF THE INVENTION

The method for manufacturing a glass fiber of this invention, which overcomes the above-discussed and numerous other disadvantages and deficiencies of the prior art, comprises the steps of:
(a) pouring molten glass into a crucible having a supply port for molten glass at an upper part thereof, a nozzle having an orbicular cross section being provided at the lower part of the crucible;
(b) heating the crucible at higher temperatures than the glass melting temperature so that molten glass to be supplied from the supply port is sufficiently mixed with molten glass stored in the crucible, maintaining the higher temperatures, heating the nozzle at lower temperatures than the heating temperature of the crucible and at slightly higher temperatures than the softening point of the molten glass so that the molten glass has a predetermined viscosity, and drawing the molten glass out of the nozzle to mold a glass fiber having an orbicular cross section; and
(c) making the glass fiber drawn out of the nozzle pass through a slit having a predetermined shape specified by a pair of half metal molds which is preheated at lower temperatures than the heating temperature of the nozzle and at slightly higher temperatures than the softening point of the glass.

In a preferred embodiment, the pair of half metal molds is a twin roller.

In a preferred embodiment, the twin roller has V-shaped grooves having a right triangular cross section on a peripheral surface thereof and the respective grooves are combined with each other.

In a preferred embodiment, one roller of the twin roller has a concave groove having a predetermined cross section on a peripheral surface thereof and the other roller of the twin roller has a flat surface on a peripheral surface thereof.

In a preferred embodiment, the glass fiber passed through a slit of the twin roller is passed through a slit of another twin roller, and the glass fiber is drawn.

In a preferred embodiment, the glass comprises 18% $TeO_2$, 14% $B_2O_3$, 45% PbO, 10% CdO, and 13% ZnO and has a softening point of 456° C.; and the heating temperature of the crucible is 800° C., the heating temperature of the nozzle is in the range of 560° to 580° C., an inner diameter of the nozzle is 6 mm, and the heating temperature of the pair of half metal molds is in the range of 510° to 530° C.

In a preferred embodiment, the glass comprises 18% $TeO_2$, 14% $B_2O_3$, 25% PbO, 20% $PbF_2$, 10% CdO, and 13% ZnO, and has a softening point of 426° C.; the heating temperature of the crucible is 800° C., the heating temperature of the nozzle is in the range of 530° to 550° C., an inner diameter of the nozzle is 6 mm, and the heating temperature of the pair of half metal molds is in the range of 480° to 500° C.

In a preferred embodiment, the glass comprises 5.3% $SiO_2$, 8.4% $B_2O_3$, 73.2% PbO, 2.5% ZnO, 1.9% $Al_2O_3$, and 8.7% CdO and has a softening point of 407° C.; and the heating temperature of the crucible is 850° C., the heating temperature of the nozzle is in the range of 510° to 530° C., an inner diameter of the nozzle is 6 mm, and the heating temperature of the pair of half metal molds is in the range of 460° to 490° C.

In a preferred embodiment, the glass comprises 35.4% $SiO_2$, 50.7% PbO, 4.8% ZnO, 4.8% $Na_2O_2$, 3.8% $K_2O$, and 0.5% $As_2O_2$, and has a softening point of 560° C.; and the heating temperature of the crucible is 1,300° C., the heating temperature of the nozzle is in the range of 780° to 850° C., an inner diameter of the nozzle is 6 mm, and the heating temperature of the pair of half metal molds is in the range of 700° to 750° C.

Thus, the invention described herein makes possible the objective of providing a method in which a glass fiber which has a polygonal cross section and has no processing deterioration layer on its surface can be efficiently produced.

BRIEF DESCRIPTION OF THE DRAWINGS

This invention may be better understood and its numerous objects and advantages will become apparent to those skilled in the art by reference to the accompanying drawings as follows:

FIG. 1 is a schematic view showing the state in which a method for producing a glass fiber according to the present invention is carried out.

FIGS. 2a, 2b, and 2c are plan views showing examples of a twin roller used in the method for producing a glass fiber according to the present invention.

FIG. 9 is a schematic view illustrating a conventional method for producing a glass fiber having a polygonal cross section without cutting a glass block.

DESCRIPTION OF THE PREFERRED EMBODIMENTS

Figure 3:
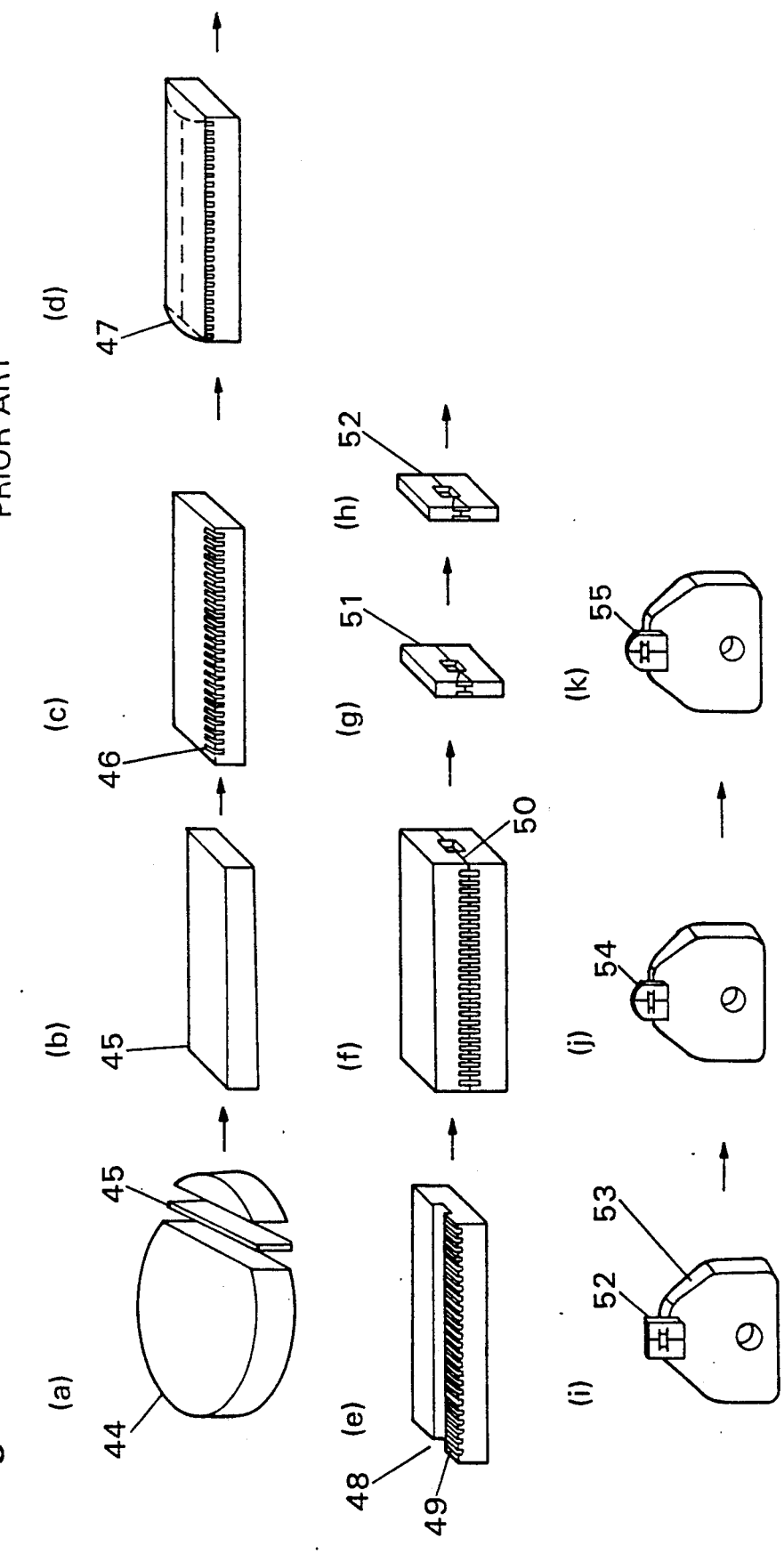
FIGS. 3a–k shows the steps for illustrating a method for producing a magnetic head.

The present invention will be described by way of illustrating examples with reference to the drawings. According to the present invention, as shown in FIG. 1, a crucible 2 and a nozzle 3 having an orbicular cross section, which is disposed at a lower part of the crucible 2 are used. Molten glass 1 is poured and stored in the crucible 2 from a supply port 7 provided at an upper part of the crucible 2. The molten glass 1 is successively drawn out of the nozzle 3 having an orbicular cross section provided at the lower part of the crucible 2. When the molten glass 1 in the crucible 2 is decreased in amount, more molten glass is supplied from the supply port 7.

The crucible 2 and the nozzle 3 are heated from outside by using an electric furnace. The crucible 2 is heated at high temperatures of 800° C. or more so that the molten glass 1 accommodated in the crucible 2 can be securely melted, and the supply of molten glass can be uniformly mixed with the molten glass 1 stored in the crucible 2. The nozzle 3 is heated at a predetermined temperature slightly higher than a softening point of the molten glass 1 stored in the crucible 2. The molten glass 1 in the crucible 2 is provided with an appropriate viscosity by heating the nozzle 3 at such a temperature and is drawn out of the nozzle 3. It is desirable that the diameter of the nozzle 3 is ten times or less than the intended thickness of the final glass fiber.

The nozzle 3 has an orbicular cross section so glass fiber 4 after being drawn out of the nozzle 3 also has an orbicular cross section. The glass fiber 4 is passed through a polygonal slit formed at a preheated twin roller 5. The twin roller 5 has, for example, as shown in FIG. 2a, V-shaped grooves having right triangle cross sections at an outer peripheral surface of the central portion of each roller in an axis direction. The grooves of each roller are combined with each other to form a slit 8 in a quadragular shape. Therefore, a glass fiber passing through the slit 8 has a quadrangular cross section and is drawn by a twin roller 5'. The twin roller 5' are used for the purpose of increasing the production speed. Because of this, a glass fiber 6 having a desired quadrangular cross section can be produced.

When the molten glass 1 stored in the crucible 2 is decreased in amount, molten glass is supplied from the supply port 7 provided at the upper part of the crucible 2. Therefore, glass fibers having a desired quadrangular cross section can be successively produced. The molten glass 1 stored in the crucible 2 is stirred by a stirring bar so that the molten glass supplied becomes uniform with molten glass 1. A heater for removing thermal distortion of glass fiber 6 having a polygonal cross section can be used after the twin roller 5.

The twin roller 2 is not restricted to that shown in FIG. 2a. As shown in FIG. 2b, a concave groove having a quadrangular cross section is formed on a peripheral surface of a central portion of one roller in its axis direction, and a flat surface is made instead of a concave groove on the peripheral surface of the central portion of the other roller in its axis direction. A slit 8' having a quadrangular cross section can be formed by closing the concave groove of one roller with the flat surface of the other roller. Moreover, as shown in FIG. 2c, a slit 8" having a triangular cross section is formed by the combination of a V-shaped groove having a triangular cross section on one roller and a flat surface on the other roller A glass fiber having a triangular cross section can be produced by this slit 8" having a triangular cross section.

Examples of materials for the twin roller 5 include heat-resistant metals such as stainless and cast iron, alumina, calcium titanate, boron nitride, and ceramics such as machinable ceramics (Trade name: MACOR, manufactured by Corning Corp.).

EXAMPLE 1

Glass comprising 18% $TeO_2$, 14% $B_2O_3$, 45% PbO, 10% CdO, and 13% ZnO, by weight and having a softening point of 456° C. was used. In FIG. 1, a crucible 2 was heated at 800° C., and a nozzle 3 was heated at a temperature in the range of 560° to 580° C. The diameter of the nozzle 3 was 6 mm. A fiber 4 having an orbicular cross section which was drawn out of the nozzle 3 was passed through a quadrangular slit 8 provided at a twin roller 5 preheated at a temperature in the range of 510° to 530° C. to obtain a fiber having a cross section of 1 mm × 1 mm. The surface of the obtained fiber was smooth and transparent.

In Example 1, when the temperature of the crucible 2 is made to be less than 800° C., glass supplied from a supply port 7 does not thoroughly mix with glass stored in the crucible 2. When the nozzle 3 is heated at more than 580° C., a predetermined viscosity of the glass cannot be obtained. As a result, the glass becomes soft enough to flow down. This is very dangerous. In contrast, when the nozzle 3 is heated at less than 560° C., the glass becomes too hard to be drawn down. Moreover, when the twin roller 5 is preheated to more than 530° C., glass adheres to the twin roller 5. When the twin roller 5 is preheated at less than 510° C., the glass cannot be formed into a predetermined polygonal shape. Furthermore, when the diameter of the nozzle 3 is more than 10 mm, the glass is likely to flow down. This is very dangerous.

EXAMPLE 2

Glass comprising 18% $TeO_2$, 14% $B_2O_3$, 25% PbO, 20% $PbF_2$, 10% CdO, and 13% ZnO, by weight and having a softening point of 426° C. was used. A glass fiber was obtained in the same way as in Example 1 except that the crucible 2 was heated at 800° C., the nozzle 3 was heated at a temperature in the range of 530° to 550° C., and the twin roller 5 was preheated to a temperature in the range of 480° to 500° C. The surface of the obtained glass fiber was smooth and transparent without any modified layer caused by the processing.

EXAMPLE 3

Glass comprising 5.3% $SiO_2$, 8.4% $B_2O_3$, 73.2% PbO, 2.5% ZnO, 1.9% $Al_2O_3$ and 8.7% CdO, by weight and having a softening point of 407° C. was used. A glass fiber was obtained in the same way as in Example 1 except that the crucible 2 was heated to 850° C., the nozzle 3 was heated to a temperature in the range of 510° to 530° C., and the twin roller 5 was preheated to a temperature in the range of 460° to 490° C. The surface of the obtained glass fiber was smooth and transparent without any modified layer caused by the processing.

EXAMPLE 4

Glass comprising 35.4% $SiO_2$, 50.7% PbO, 4.8% ZnO, 4.8% $Na_2O_2$, 3.8% $K_2O$, and 0.5% $As_2O_2$, by weight and having a softening point of 560° C. was used. A glass fiber was obtained in the same way as in Example 1 except that the crucible 2 was heated to 1,300° C., the nozzle 3 was heated to a temperature in the range of 780° to 850° C., and the twin roller 5 was preheated to a temperature in the range of 700° to 750° C. The surface of the obtained glass fiber was smooth and transparent without any modified layer caused by the processing.

EXAMPLE 5

Figure 4:
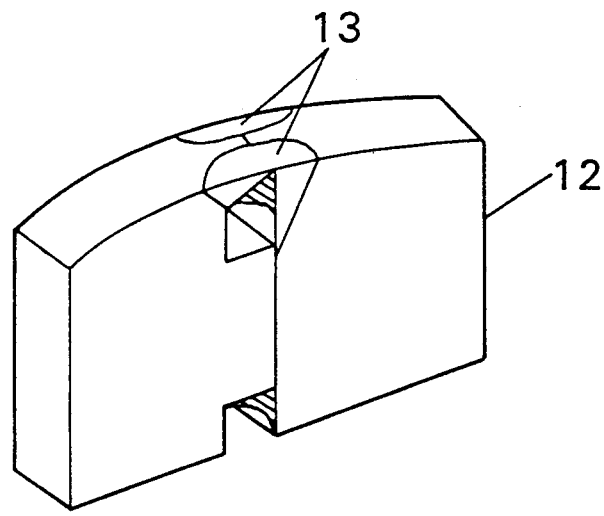
FIG. 4 is a perspective view showing an enlarged portion of the produced magnetic head.
Figure 5:
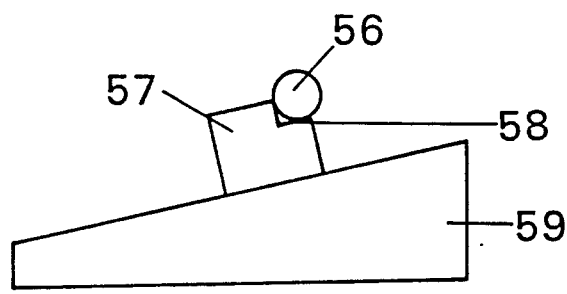
FIG. 5 is a schematic view illustrating a glass molding method of a conventional magnetic head corresponding to a glass molding method shown in FIG. 3 using glass having an orbicular cross section.
Figure 6:
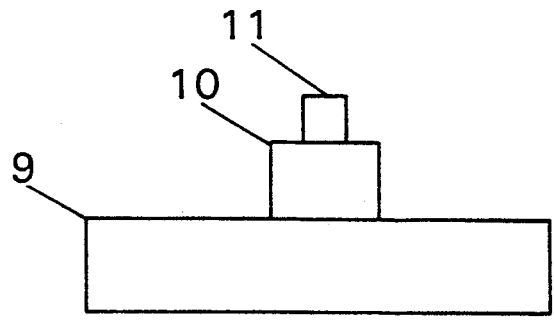
FIG. 6 is a schematic view illustrating a glass molding method of a conventional magnetic head corresponding to a glass molding method shown in FIG. 3 using glass having a quadrangular cross section.
Figure 7:
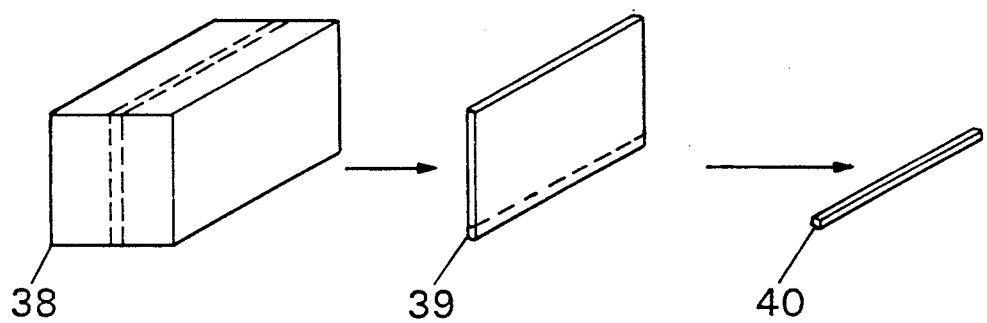
FIGS. 7 and 8 are schematic views illustrating a method for producing a conventional glass fiber having a polygonal cross section.
Figure 8:
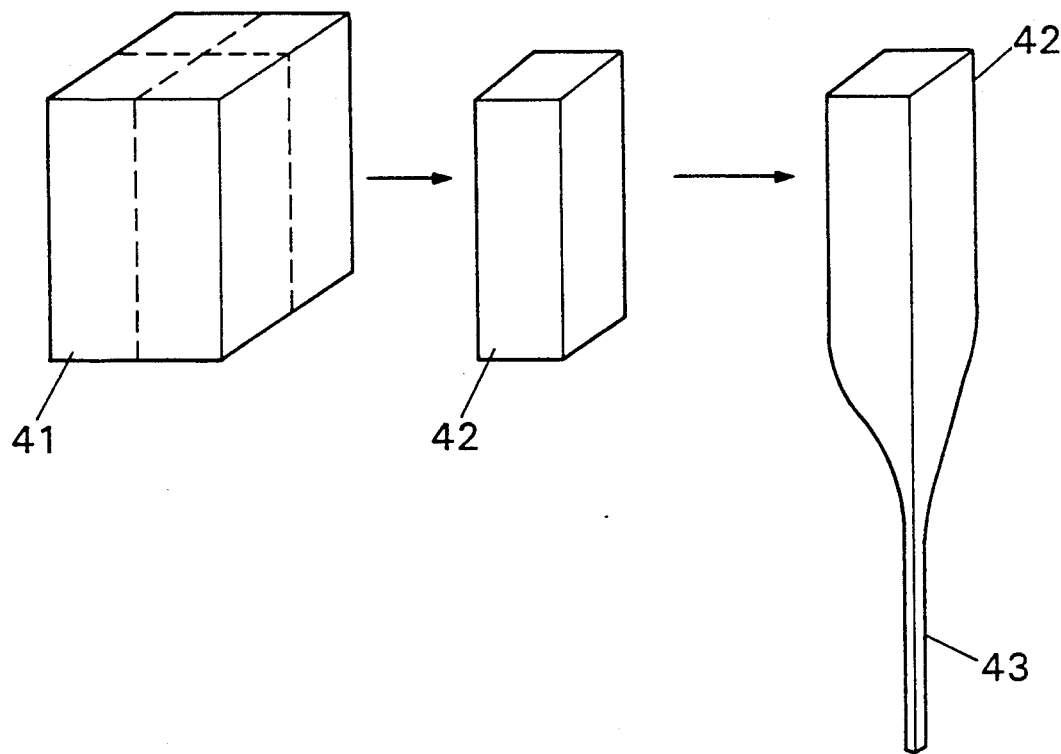
Figure 10A:
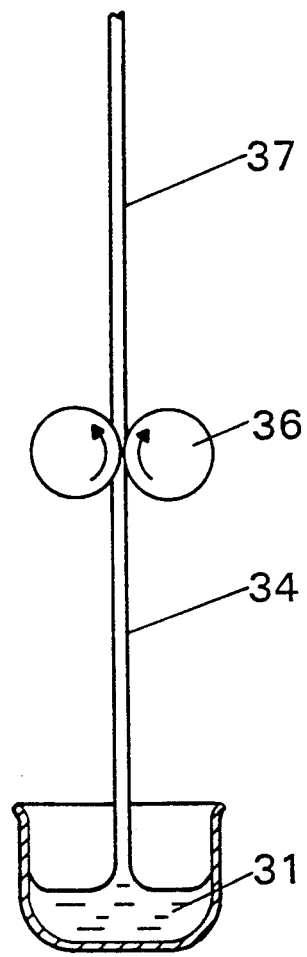
FIG. 10a is a schematic view illustrating another conventional method for producing a glass fiber having a polygonal cross section without cutting a glass block.
Figure 10B:
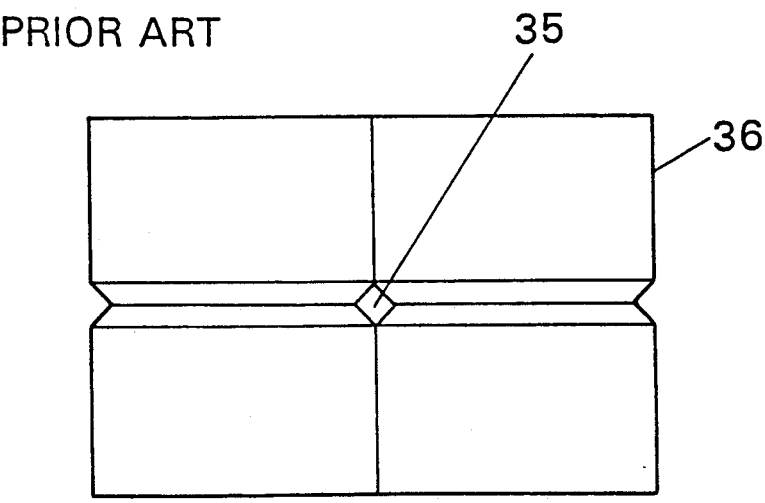
FIG. 10b is a plan view of a twin roller used in this method.

The glass fiber having a cross section of 1 mm × 1 mm produced in Example 1 was used to obtain a magnetic head. The production method was the same as the conventional one shown in FIG. 3 except for the following. The shape of a cross section and the dimension of the glass fiber used were different. When the glass was molded, a manganese-zinc ferrite 10 provided with a groove was placed on a horizontal jig 9, on which a glass fiber 11 having a cross section of 1 mm × 1 mm produced in Example 1 was placed. In the magnetic head produced as described above, the glass for adhesion 13 shown in FIG. 4 had fewer bubbles compared with the glass for adhesion of the magnetic head produced by the conventional method.

In the above-mentioned examples, a glass fiber having a quadrangular cross section was described. However, the glass fiber is not restricted to this shape. Fibers having a polygonal cross section such as trapezoidal, hexagonal, semi-circular, or semi-elliptical cross section can be produced simply by changing the shape of the roller. Sealing by using a glass fiber having a polygonal cross section is applicable to a sealing for various electronic parts as well as for magnetic heads. The production method of the present invention is applicable to the production of optical fibers. Moreover, in the examples, glass having a specific composition was described. Glass having various compositions can also be used.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing all the features of patentable novelty that reside in the present invention, including all features that would be treated as equivalents thereof by those skilled in the art to which this invention pertains.

What is claimed is:

1. A method for manufacturing a glass fiber, comprising the steps of:
   (a) pouring molten glass into a crucible having a supply port for molten glass at an upper part thereof, a nozzle having an orbicular cross section being provided at a lower part of the crucible;
   (b) heating the crucible at higher temperatures than the glass melting temperature so that molten glass to be supplied from the supply port is sufficiently mixed with molten glass stored in the crucible, maintaining the higher temperatures, heating the nozzle at lower temperatures than the heating temperature of the crucible and at slightly higher temperatures than the softening point of the molten glass so that the molten glass has a predetermined viscosity, and drawing the molten glass out of the nozzle to mold a glass fiber having an orbicular cross section; and
   (c) making the glass fiber drawn out of the nozzle pass through a slit having a predetermined shape specified by a pair of half metal molds which is preheated at lower temperatures than the heating temperature of the nozzle and at slightly higher temperatures than the softening point of the glass, wherein the diameter of the nozzle is ten times or less than the intended thickness of the final glass fiber.

2. A method for manufacturing a glass fiber according to claim 1, wherein the pair of half metal molds is a twin roller.

3. A method for manufacturing a glass fiber according to claim 2, wherein the twin roller has V-shaped groovs having a right triangular cross section on a peripheral surface thereof and respective grooves are combined with each other.

4. A method for manufacturing a glass fiber according to claim 2, wherein one roller of the twin roller has a concave groove having a predetermined cross section on a peripheral surface thereof and the other roller of the twin roller has a flat surface on a peripheral surface thereof.

5. A method for manufacturing a glass fiber according to claim 2, wherein the glass fiber passed through a slit of the twin roller is passed through a slit of another twin roller, and the glass fiber is drawn.

6. A method for manufacturing a glass fiber according to claim 1, wherein the glass comprises 18% $TeO_2$, 14% $B_2O_3$, 45% PbO, 10% CdO, and 13% ZnO and has a softening point of 456° C.; and the heating temperature of the crucible is 800° C., and the heating temperature of the nozzle is in the range of 560° to 580° C., an inner diameter of the nozzle is 6 mm, and the heating temperature of the pair of half metal molds is in the range of 510° to 530° C.

7. A method for manufacturing a glass fiber according to claim 1, wherein the glass comprises 18% $TeO_2$, 14% $B_2O_3$, 25% PbO, 20% $PbF_2$, 10% CdO, and 13% ZnO, and has a softening point of 426° C.; the heating temperature of the crucible is 800° C., the heating temperature of the nozzle is in the range of 530° to 550° C., an inner diameter of the nozzle is 6 mm, and the heating temperature of the pair of half metal molds is in the range of 480° to 500° C.

8. A method for manufacturing a glass fiber according to claim 1, wherein the glass comprises 5.3% $SiO_2$, 8.4% $B_2O_3$, 73.2% PbO, 2.5% ZnO, 1.9% $Al_2O_3$, and 8.7% CdO and has a softening point of 407° C.; and the heating temperature of the crucible is 850° C., the heating temperature of the nozzle is in the range of 510° to 530° C., an inner diameter of the nozzle is 6 mm, and the heating temperature of the pair of half metal molds is in the range of 460° to 490° C.

9. A method for manufacturing a glass fiber according to claim 1, wherein the glass comprises 35.4% $SiO_2$, 50.7% PbO, 4.8% ZnO, 4.8% $Na_2O_2$, 3.8% $K_2O$, and 0.5% $As_2O_2$, and has a softening point of 560° C.; and the heating temperature of the crucible is 1,300° C., the heating temperature of the nozzle is in the range of 780° to 850° C., an inner diameter of the nozzle is 6 mm, and the heating temperature of the pair of half metal molds is in the range of 700° to 750° C.

* * * * *